United States Patent [19]

Wei

[11] Patent Number: 4,481,179

[45] Date of Patent: Nov. 6, 1984

[54] METHOD FOR FORMING FIBROUS SILICON CARBIDE INSULATING MATERIAL

[75] Inventor: George C. Wei, Oak Ridge, Tenn.

[73] Assignee: The United States of America as represented by the United States Department of Energy, Washington, D.C.

[21] Appl. No.: 541,196

[22] Filed: Oct. 12, 1983

[51] Int. Cl.$^3$ .............................................. C04B 35/56
[52] U.S. Cl. ...................................... 423/346; 501/88; 501/90
[58] Field of Search .................... 501/88, 90; 423/346; 264/29.2

[56] References Cited

U.S. PATENT DOCUMENTS

| | | | |
|---|---|---|---|
| 3,577,344 | 5/1971 | Ardary et al. | 264/44 |
| 3,653,851 | 4/1972 | Gruber | 501/88 |
| 3,702,279 | 11/1972 | Ardary et al. | 156/89 |
| 3,793,204 | 2/1974 | Ardary et al. | 252/62 |
| 4,118,464 | 10/1978 | Cutler | 423/346 |

*Primary Examiner*—Mark Bell
*Attorney, Agent, or Firm*—Edwin D. Grant; Stephen D. Hamel; Michael F. Esposito

[57] ABSTRACT

A method whereby silicon carbide-bonded SiC fiber composites are prepared from carbon-bonded C fiber composites is disclosed. Carbon-bonded C fiber composite material is treated with gaseous silicon monoxide generated from the reaction of a mixture of colloidal silica and carbon black at an elevated temperature in an argon atmosphere. The carbon in the carbon bond and fiber is thus chemically converted to SiC resulting in a silicon carbide-bonded SiC fiber composite that can be used for fabricating dense, high-strength high-toughness SiC composites or as thermal insulating materials in oxidizing environments.

3 Claims, No Drawings

METHOD FOR FORMING FIBROUS SILICON CARBIDE INSULATING MATERIAL

BACKGROUND OF THE INVENTION

This invention resulted from a contract with the United States Department of Energy and relates to a method for forming a thermal insulating material containing silicon carbide fibers.

Lightweight, thermal insulating materials for use in aerospace and other high-temperature application have been prepared by heat treating a molded mixture of refractory or carbonaceous fibers and a carbonizable bonding agent. These carbon-bonded, carbon-fiber materials have been made even more efficient by the addition of graphite particles. However, since oxidants deleteriously affect carbon at high temperatures, the use of carbon-bonded carbon-fiber insulation subject to such temperatures is restricted to environments in which a reducing or neutral atmosphere is maintained. This restriction has been essentially overcome by the development of low density thermal insulation which consists primarily of inorganic matrix binding together inorganic fibers. Such composites can be formed by impregnating a formed structure of inorganic fibers (such as silica) with a matrix-forming inorganic sol which is then gelatinized and cured. The resulting composite is subsequently dried and fired at a temperature adequate to sinter the particles providing the matrix. The physical properties and thermal insulation characteristics of the material thus produced compares favorably with carbon-bonded, carbon-fiber insulation, and in addition it can be employed at high temperature in oxygen containing environments. However, the previously used method for preparing this material is cumbersome and cannot conveniently be used for large scale production.

SUMMARY OF THE INVENTION

It is an object of this invention to provide a simplified method for preparing lightweight high-temperature SiC-bonded, SiC-fiber composites for use as thermal insulating material in oxidizing environments. It is another object of this invention to provide a simplified method for preparing SiC-bonded, SiC-fiber composite preforms that can be used for fabricating dense, high-strength, high-toughness, oxidation resistant SiC composites.

The starting material used in the method of this invention may be a carbon-bonded, carbon-fiber composite prepared by the process described in U.S. Pat. No. 3,577,344. This carbon-bonded, carbon-fiber material is embedded in a 1:1 molar ratio mixture of colloidal silica and carbon black contained in a graphite vessel. The graphite vessel is covered, placed in a graphite furnace under an argon atmosphere, and heated to 1,600° C. Under these conditions, the colloidal silica and carbon black react according to the equation:

  (1)

The SiO gas then penetrates into the carbon fiber composite and reacts with the carbon fiber and bond to form a silicon carbide composite according to the reaction

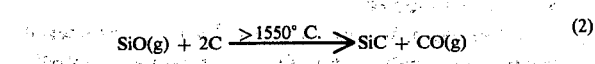  (2)

The SiC fibrous composites so produced are about 80-90% porous but have sufficient rigidity for use as monolithic thermal insulation materials or fiber preforms for SiC-impregnated high-density composites.

DETAILED DESCRIPTION OF THE INVENTION

A carbon-bonded carbon-fiber composite was made from chopped rayon-precursor carbon fibers and carbonizable binders by vacuum-molding from water slurries and carbonized for use as a starting material for the SiC composite in the present method. This carbon-bonded, carbon-fiber composite has bulk densities in the range of 0.2 to 0.3 g/cc. It is packed in a mixture consisting of colloidal silica and carbon black (in a 1:1 molar ratio) in a semienclosed graphite container. The packing powder mixture reacts according to equation (1) above. The SiO gases then penetrate into the carbon fiber composite and react with the carbon fiber and bond to form a silicon carbide composite according to equation (2) above. The above reactions will proceed at temperatures above 1550° C. in argon. The SiC fibrous composites so produced are about 80-90% porous but have sufficient rigidity for use as monolithic thermal insulation materials or fiber preforms for SiC impregnated high-density composite. Further details of a preferred method of forming a SiC composite are given in the following example.

EXAMPLE I

Ten grams of colloidal silica (Cabosil M-5 from Cabot Corp.) was mixed with 2 g of carbon black (Philblack N330) in 200 cc of water in a Waring blender. The mixture was then dried in air at 120° C. for 16 h. The dried mixture was ground with mortar and pestle. A carbon-bonded carbon-fiber preform [density=0.20 g/cc, made by carbonizing (1,600° C.) a vacuum-molded form of carbon fiber and carbon binder] was packed in the ground mixture of silica and carbon in a graphite container with a top cover. The reactants were heated in a graphite furnace to 1,600° C. for one h under Ar to form a SiC-fiber SiC-bonded composite with a density of about 0.3 g/cc.

The SiC composite was examined using scanning electron microscopy and X-ray diffraction. The results showed a microstructure of SiC-bonded SiC-fiber network with about 80-90% open porosity. The SiC composite has sufficient rigidity for handling and its thermal conductivity is estimated to be very low (~0.08 W/m·K at 25° C. and ~0.27 W/m·k at 1,600° C. in air).

The simplicity of the method disclosed herein makes it advantageous for quantity production of a fibrous SiC thermal insulating material. The gaseous SiO is generated by an easily controllable endothermic reaction and penetrates the carbon fiber composite to react with the carbon uniformly. The product SiC fiber composite is a rigid thermal insulation material with better dimensional stability than oxide fiber insulations and better oxidation resistance than carbon fiber insulation.

It is obvious that one of ordinary skill in the art could devise alternate versions of the disclosed method. For example, gaseous SiO could readily be generated in a first container and then passed into a second container holding the precursor material formed of carbon fibers.

What is claimed is:

1. A method of forming a thermal insulating material consisting essentially of SiC fibers, consisting essentially of:
   forming a precursor material wherein carbon fibers are bonded together by a carbon binder; and
   contacting gaseous SiO with said precursor material to thereby convert the carbon fibers and carbon binder therein to SiC.

2. The method of claim 1 wherein said precursor material is contacted with a mixture of silica and carbon; and
   said precursor material and said mixture of silica and carbon are heated to thereby convert said silica and carbon to SiO.

3. The method of claim 2 wherein said mixture of silica and carbon is placed around said precursor material while being heated to convert it to SiO.

* * * * *